United States Patent
Katsuki et al.

(10) Patent No.: US 9,881,230 B2
(45) Date of Patent: Jan. 30, 2018

(54) SYSTEM AND METHOD FOR AUTOMATED ROAD IDENTIFICATION IN DISTANT TRAFFIC CAMERA IMAGES

(71) Applicant: INTERNATIONAL BUSINESS MACHINES CORPORATION, Armonk, NY (US)

(72) Inventors: Takayuki Katsuki, Tokyo (JP); Michiaki Tatsubori, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 15/152,058

(22) Filed: May 11, 2016

(65) Prior Publication Data
US 2017/0330051 A1    Nov. 16, 2017

(51) Int. Cl.
| G06K 9/46 | (2006.01) |
| G06K 9/00 | (2006.01) |
| G06K 9/62 | (2006.01) |
| H04N 5/225 | (2006.01) |
| G06F 17/30 | (2006.01) |

(52) U.S. Cl.
CPC ..... *G06K 9/4604* (2013.01); *G06F 17/30241* (2013.01); *G06F 17/30268* (2013.01); *G06K 9/00651* (2013.01); *G06K 9/00771* (2013.01); *G06K 9/6202* (2013.01); *H04N 5/225* (2013.01)

(58) Field of Classification Search
None
See application file for complete search history.

(56) References Cited

U.S. PATENT DOCUMENTS

| 6,351,706 | B1* | 2/2002 | Morimoto | G01C 21/367 340/995.14 |
| 6,711,293 | B1 | 3/2004 | Lowe | |
| 8,750,567 | B2 | 6/2014 | Zhang et al. | |
| 2009/0276153 | A1 | 11/2009 | Lee | |
| 2010/0232712 | A1* | 9/2010 | Tomita | G06K 9/00228 382/209 |
| 2010/0250125 | A1* | 9/2010 | Lundberg | H04N 13/0207 701/532 |
| 2012/0327241 | A1* | 12/2012 | Howe | G06K 9/00771 348/155 |
| 2013/0265424 | A1 | 10/2013 | Zhang et al. | |
| 2013/0278761 | A1* | 10/2013 | Wu | G06K 9/00785 348/143 |
| 2015/0222859 | A1* | 8/2015 | Schweid | G06K 9/00624 348/148 |
| 2016/0188953 | A1* | 6/2016 | Tabb | G06K 9/0063 382/103 |

OTHER PUBLICATIONS

Elliethy, Ahmed, and Gaurav Sharma. "Automatic registration of wide area motion imagery to vector road maps by exploiting vehicle detections." IEEE transactions on image processing 25.11 (2016): 5304-5315.*

(Continued)

*Primary Examiner* — Michelle M Hausmann
(74) *Attorney, Agent, or Firm* — Louis J. Percello; Otterstedt, Ellenbogen & Kammer, LLP (57) ABSTRACT

In embodiments the invention provides methods and systems for improved monitoring of roadways and related resources. The methods employ frugal devices such as remote webcams, and provide methods for improving the quality and usefulness of the data obtained from such devices.

19 Claims, 2 Drawing Sheets

(56) References Cited

OTHER PUBLICATIONS

Piccioli, Giulia, Enrico De Micheli, and Marco Campani. "A robust method for road sign detection and recognition." Computer Vision—ECCV'94 (1994): 493-500.*

Yu, Yongtao, et al. "Bag of Contextual-Visual Words for Road Scene Object Detection From Mobile Laser Scanning Data." IEEE Transactions on Intelligent Transportation Systems 17.12 (2016): 3391-3406.*

Grabler, Floraine, et al. Automatic generation of tourist maps. vol. 27. No. 3. ACM, 2008.*

Datta, Ritendra, Dhiraj Joshi, Jia Li, and James Z. Wang. "Image retrieval: Ideas, influences, and trends of the new age." ACM Computing Surveys (Csur) 40, No. 2 (2008): 5. Mar. 13, 2007 pp. 1-6.

Morel, Jean-Michel, and Guoshen Yu. "ASIFT: A new framework for fully affine invariant image comparison." SIAM Journal on Imaging Sciences 2, No. 2 (2009): 438-469.

McHugh, J. Mike, Janusz Konrad, Venkatesh Saligrama, and Pierre-Marc Jodoin. "Foreground-adaptive background subtraction." IEEE Signal Processing Letters 16, No. 5 (2009): 390-393.

Katsuki, Takayuki, Tetsuro Morimura, and Tsuyoshi Idé. "Unsupervised object counting without object recognition." In Pattern Recognition (ICPR), 2016 23rd International Conference on, pp. 3627-3632. IEEE, 2016.

Katasuki, Takayuki, Tetsuro Morimura, and Tsuyoshi Ide. "Bayesian unsupervised vehicle counting." Technical Report, IBM Research RT0951 (2013), pp. 1-11.

* cited by examiner

Distribution of $f(\theta_0, \theta_1, d)$

FIG. 3

Distribution of $x$

FIG. 4

○ : random variables

◇ : observed variables

FIG. 5

SYSTEM AND METHOD FOR AUTOMATED ROAD IDENTIFICATION IN DISTANT TRAFFIC CAMERA IMAGES

FIELD OF THE INVENTION

In embodiments, the technical field of the invention is methods and systems for improved monitoring of roadways and related resources.

BACKGROUND

Inexpensive fixed-point cameras may be called webcams and, as frequently used for capturing vehicles on roads, are useful as a "virtual sensor" providing vehicle volume and velocity observations. A variety of webcam-based Internet sites offer real-time traffic images to help motorists and other stakeholders. Typically such cameras are subject to small movements by a variety of forces such as wind and rain, birds landing on the camera, etc. Therefore even though such webcams are considered fixed-point cameras, the image on any given day/time may be slightly different from the intended or original image. Furthermore, due to the inexpensive nature of such cameras, new webcams are constantly being added to the Internet. Indexing and maintaining a library of every available camera and the roads that are targeted by the same has proven difficult. Unfortunately, image analysis requires fine tuning for identifying roads in captured images, and such analysis is often therefore impractical.

Content-based image retrieval techniques use the image features of color, texture, edges, etc. in an affine-transformation-robust manner. They cannot, however, be of use for detecting how to transform a captured image to match each road in the image to roads in a map. Furthermore such techniques are not tolerant to general projection transformation including keystone effects, in addition to scaling, rotation, and skews. Improved methods of processing web cam images therefore remains desirable.

SUMMARY OF THE INVENTION

In an aspect is a method for identifying features in an image, the method comprising: determining a plurality of scaling ratios from average vehicle sizes in an image from a fixed-point traffic camera; determining an ortho mapping function from the plurality of scaling ratios; producing, using the ortho mapping function, an ortho projection of a road part extracted from the image; identifying an identification label of a road part in a map corresponding to the road part in the ortho projection; and producing a road-labeled image from the image and the identification label. In embodiments:

the method further comprises determining narrative information from the map;

the method further comprises receiving, by a server via a network, the image from the fixed-point traffic camera;

the method further comprises transmitting the road-labeled image via a network;

the scaling ratios are identified at two or more points in the image corresponding to different positions along a single roadway;

the image is an image comprising roadways and vehicles, and wherein the traffic camera is remote from the server;

the method further comprises determining narrative information from the map and transmitting the identification label and the narrative information via a network;

the method further comprises using keywords to identify the map from a database of maps;

the map is a GIS (geographic information system) map;

the map is a GIS (geographic information system) map and contains information selected from road location information, road identification information, elevation information, land use information, and combinations thereof;

the method further comprises advising a fixed-point camera annotator, and correlating a portion of the image to the road-labeled image;

the method further comprises receiving, by a server via a network, the image from the fixed-point traffic camera, and wherein the method further comprises transmitting the road-labeled image via a network;

the scaling ratios are identified at two or more points in the image corresponding to different positions along a single roadway, and wherein the method further comprises determining narrative information from the map and transmitting the identification label and the narrative information via a network; and the scaling ratios are identified at two or more points in the image corresponding to different positions along a single roadway, and wherein the method further comprises advising a fixed-point camera annotator, and correlating a portion of the image to the road-labeled image.

In an aspect is a computer system for identifying features in an image, comprising: a processor; a memory coupled to the processor, the memory configured to store program instructions executable by the processor to cause the computer system to: determining a plurality of scaling ratios from average vehicle sizes in an image from a fixed point traffic camera; determining an ortho mapping function from the plurality of scaling ratios; producing, using the ortho mapping function, an ortho projection of a road part extracted from the image; identifying an identification label of a road part in a map corresponding to the road part in the ortho projection; and producing a road-labeled image from the image and the identification label. In embodiments:

the program instructions are non-transitory;

the system further comprises advising a fixed-point camera annotator, and correlating a portion of the image to the road-labeled image;

the method further comprises receiving, by a server via a network, the image from the fixed-point traffic camera, and wherein the method further comprises transmitting the road-labeled image via a network;

the scaling ratios are identified at two or more points in the image corresponding to different positions along a single roadway, and wherein the method further comprises determining narrative information from the GIS map and transmitting the identification label and the narrative information via a network; and the scaling ratios are identified at two or more points in the image corresponding to different positions along a single roadway, and wherein the method further comprises advising a fixed-point camera annotator, and correlating a portion of the image to the road-labeled image.

In an aspect is a method for managing road use, the method comprising: determining a plurality of scaling ratios from average vehicle sizes in an image from a fixed point traffic camera; determining an ortho mapping function from the plurality of scaling ratios; producing, using the ortho mapping function, an ortho projection of a road part extracted from the image; identifying an identification label of a road part in a map corresponding to the road part in the ortho projection; and producing a road-labelled image from the image and the identification label. In embodiments:

the method further comprises advising a fixed-point camera annotator, who specifies which part of camera view corresponds to which part of a road, based on the road-labeled image; and the method further comprises automatically generating an alert and transmitting the alert via a network when the road-labeled image surpasses a threshold traffic volume.

These and other aspects of the invention will be apparent to one of skill in the art from the description provided herein, including the examples and claims.

DETAILED DESCRIPTION OF VARIOUS EMBODIMENTS

It is desirable to automate or semi-automate the identification of roads in captured webcam images. Then, given a set of fixed-point camera images (e.g. a URL of webcam images) and narrative information of the target (e.g. names of intersections from a map or database), each road portion in the images can be mapped to a position in a map of roads.

In an aspect is a method for identifying features in an image (which image is referred to herein as "the image" or "the original image"). In embodiments, the image is a digital photographic image. The digital photographic image is a still image, and may be a single/independent image not from a sequence of images, or may be a single image taken from a sequence of images that form a video. In embodiments the image is isolated from a live video data stream The image may be in any suitable digital file format, such as JPEG, TIFF, or the like. Where the image is extracted from a sequence of images, the original data may be of any suitable digital format, such as MP4, MOV, RGB, BGR, YUV, or the like. The file format is not a critical aspect of the invention, and methods for processing different file formats are known and will be adaptable to the disclosed methods by one of ordinary skill in the art. Processing of the image may occur at any suitable step in the disclosed processes. Examples of processing include isolating a single still from a motion picture in order to obtain the image, editing the image (e.g., cropping, rotating, adjusting contrast, filtering, or the like), marking/appending the image with metadata, etc.

The image may be taken by any suitable imaging device. The imaging device may be a stand-alone digital camera, or the imaging device may be a multipurpose device wherein a digital camera is a component thereof (examples include a computer, tablet, or the like). A variety of digital cameras are known and are suitable for the disclosed methods, as are later-developed devices that capture images capable of being similarly processed. Examples include USB-type cameras and CCTV-type cameras. In embodiments, the imaging device is configured for performing continuous image capture. In embodiments, the imaging device is configured to capture images in a variety of lighting situations. In embodiments, the camera contains a visible light component for capturing images in daylight. In addition to a visible light component, in some embodiments the device further contains an infrared camera component that enables the device to capture images at night.

In embodiments, the imaging device is a fixed-point device, meaning that the device is securely and/or permanently fixed in position. A fixed-point device may, however, include mechanisms for changing the field of view. Such mechanisms include, for example, a rotator for rotating the device around a fixed axis, an elevator for moving the field of view of the device up or down relative to the ground, a zoom feature for zooming in and out (i.e., changing the magnification of the captured images), and the like. Examples of fixed-point devices include traffic cameras and other webcams, which are generally placed in a location that allows the camera to continuously monitor traffic. In other embodiments, the imaging device is not a fixed-point device but is mobile, such as a camera on a laptop or the like.

It will be appreciated that there are numerous file formats, image-capture device formats, interfaces, and the like, some of which provide standard output and others provide non-standard output. The foregoing discussion is therefore provided merely as a non-exhaustive guide with the goal of obtaining an image suitable for further processing by the disclosed methods. In embodiments, the image is a two-dimensional image of known pixel dimensions. The image contains a plurality of identifiable pixels. Each of the pixels includes a set of bits that correspond to a color on a predetermined color map that represents a color intensity value. Alternatively, the images may be grayscale images, with each pixel including data that corresponds to a gray value.

The imaging device comprises or is in digital connection with a communications component. The communications component allows data obtained from the imaging device to be transmitted to a remote server. The data that is transmitted may be raw still image data, raw video data, processed image data, processed video data, or a combination thereof, as appropriate. In embodiments, the data that is transmitted is still image data. In embodiments, the data that is transmitted is a live camera feed. The imaging device may include a time-delay prior to transmitting data, or may provide data without any delay. Transmission of the data may be via any suitable network, including fixed-line networks and cellular networks. In embodiments, the transmission is via a cellular network such as a GSM network or the like. In such embodiments, the communications component may contain a SIM as well as suitable communications circuitry.

The imaging device obtains power from any suitable source. Examples include a fixed electricity grid, solar cells, batteries, generators, and combinations thereof.

The images captured by the imaging device may be stored in a memory of the imaging device, transferred to an off-board memory device, or may be directly transferred to the server for analysis. In some embodiments, the imaging device contains minimal or no on-board memory, and transmits data directly as the data is acquired. In other embodiments, the imaging device stores data in on-board memory for later transmission. This embodiment is particularly suitable where Internet connectivity is sporadic. The transmitted data is received by the server and may be stored or may proceed directly to processing. Again, processing may involve one or more pre-processing steps that prepare the acquired image for processing according to the disclosure. Such pre-processing includes cropping, rotating, de-coloring, and the like. In embodiments, the imaging device is remote from the server, and the server may be configured to collect images from a plurality of remote imaging devices. The data acquired by the imaging device may be appended with metadata. The metadata may be appended either prior to transmission of the data by the imaging device (or an associated communications component), or after receipt by the server. For example, the metadata may include narrative information about the imaging device—e.g., an identification label for the imaging device, or labels/names identifying the roads that are imaged by the imaging device, etc.

Apart from the format of the image, the content of the image comprises one or more roadway(s) and the contents of such roadway(s). The image may comprise 1, 2, 3, or more than 3 roadways, optionally including 1, 2, 3, or more than 3 intersections of two or more roadways. The contents of a roadway typically comprises vehicles, which may be any combination of personal cars, motorcycles, buses, small trucks, minivans, conversion vans, large trucks, cargo vans, and the like. Because the imaging device is typically terrestrially located, the image is skewed rather than being an orthogonal view of the roadway(s) and the contents thereof. The amount of skew is determined by the elevation of the imaging device as well as the distance between the imaging device and the target (i.e., the subject of the image).

Processing of the image according to the disclosed methods involves extracting road parts from the image. A road part is a portion of roadway in the image. The road part may traverse the image in any direction—e.g., perpendicular to the view from the imaging device (i.e., 90° to the imaging device view), parallel to the view from the imaging device (i.e., 0° to the imaging device view), or anywhere between such values. The road parts may include side-roads, intersections, junctions, roundabouts, alleys, road portions (e.g., if only a portion of a road part is visible in an image), etc., or combinations thereof. Extraction of the road parts may be carried out by any known or later developed methods. An example method is by using background subtraction. Another example or a complimentary example is to use moving object recognition to recognize vehicles traveling on the road parts. In embodiments, determining or extracting the road parts from an image enables downstream calculations to focus entirely on the vehicles that are on the road parts, thereby ignoring other features in the images.

The extracted road parts can be used to create a black and white (i.e., binary) image of the road parts in the image. Such an image (referred to herein as the "extracted road parts image") may be used to aid in filtering out noise and other unwanted data from the image, or in selecting vehicles or other features, etc.

Processing of the image according to the disclosed methods further involves determining a plurality of scaling ratios from average vehicle sizes in an image. The image is therefore subjected to automated, digital analysis that identifies one or more vehicles in the images, identifies the endpoints of a single vehicle (i.e., the front and back ends of a vehicle as it appears in an image), and calculates the distance between the endpoints. This process is repeated for a plurality of vehicles at different locations throughout the image. The repeated process provides a collection of vehicle lengths at different coordinates within the image. For images with a sufficient density of vehicles, averages can be obtained—e.g., the sizes of vehicles that are located in the same region of the image may be averaged in order to reduce error. For example, vehicle sizes in the top right quadrant of the image may be averaged to obtain a single average vehicle size. A vehicle size or an average vehicle size can be used to determine a scaling ratio—this is a ratio between a standardized average vehicle size and the calculated average vehicle size in a portion of an image. This process is repeated until a plurality of scaling ratios is obtained for an image. For example, 2, 3, 5, 10, 20, 50, 100, 1000, or more than 1000 scaling ratios may be obtained for an image. In embodiments, a scaling ratio may be obtained at every location where a vehicle is identified in the image. In embodiments, a scaling ratio may be obtained only along the road parts, provided that the road parts have been extracted from the image prior to determining scaling ratios. In embodiments, the scaling ratios are determined for at least two points in an image corresponding to different positions along a single roadway. In such embodiments and similar embodiments, the extracted road parts can be used to help identify vehicles, such as vehicles along a single roadway. In embodiments, a scaling ratio may be obtained for every pixel (or every other pixel, or some other standardized quantity) in the image. In such embodiments, the average vehicle sizes that are calculated at various points can each be used to calculate a plurality of scaling ratios. Alternatively or in addition, multiple average vehicle sizes (e.g., within a selected region of the image) can be used to calculate a single scaling ratio, and a scaling factor may be applied to the multiple vehicle sizes in order to increase the accuracy of the scaling ratios. In an embodiment, small regions can be selected in the image (e.g., along road parts), and all vehicle sizes within each region can be calculated and averaged in order to obtain an average within each region. Various methods for selecting groups of vehicles for averaging vehicle sizes can be used and are known. Examples include methods for counting vehicles, background subtraction, clustering methods, and the like. A larger number of scaling ratios are desirable, as this will increase the accuracy of the output, as discussed herein. It will be thus be appreciated that the vehicles in an image that are used to calculate scaling ratios need not be moving vehicles—e.g., parked and otherwise stationary vehicles can still provide information for calculating scaling ratios. The scaling ratios can be tabulated and appended with metadata if desired (e.g., a time stamp, the number of vehicles used to create an average vehicle size, or the like).

The scaling ratio makes use of the fact that vehicles that are relatively farther away from the imaging device will appear in an image to be (on average) smaller than vehicles that are relatively closer to the imaging device. The relative difference between scaling ratios determined for a single image can provide an indication of the orientation of the roadways. For example, where a roadway travels across an image in a direction that is exactly perpendicular to the view from the imaging device, the scaling ratios for the extreme right side of the image will be identical (within error) to the scaling ratios in the extreme left side of the image. This follows because the vehicles at the extreme right of the image are equidistant from the imaging device compared with the vehicles at the extreme left of the image. In contrast, if an image produces scaling ratios that are significantly different on the left side of the image compared with those on the right side of the image, it follows that the roadway in the image is heading in a direction that is not perpendicular to the imaging device, but is rather skewed to some degree.

In embodiments, the plurality of scaling ratios obtained for an image is used to determine an ortho mapping function. The ortho mapping function is also referred to herein as a map projection reverse transformation (MPRT), and is a function that converts the extracted road parts image into an ortho image of the road parts (also referred to herein as an ortho road parts image). The MPRT is represented as follows:

$$x = f_1(\varphi, \lambda), \; y = f_2(\varphi, \lambda) \quad (1)$$

$$\varphi = F_1(x, y), \; \lambda = F_2(x, y) \quad (2)$$

where F1 and F2 convert x and y coordinates (e.g., pixels from the image or the extracted road parts image) into the $\varphi$ and $\lambda$ coordinates that form an ortho road parts image. It will be appreciated that f1 and f2 provides the inverse function, also referred to as a map projection. Using the MPRT, the computer system creates an ortho projection of at least one road part from the image. In embodiments, the MPRT is used to create an ortho projection of all extracted road parts from the image. The resulting ortho road parts image may be stored in memory, for example.

Optionally, processing of the image according to the disclosed methods further involves determining information from a relevant map. A map is "relevant" where it contains a road part (at least one, and optionally more than one) that corresponds to a road part in the image. By "corresponds" is meant that the road part in the map is meant to represent the real-life road part that is captured in the image. In embodiments, the relevant map is a GIS (geographic information system) map. The map may be a map from a digital collection/library of maps. An example of such is the OpenStreetMap database of online, editable street maps. In embodiments, the map is identified as relevant via a keyword search of a collection of maps, wherein the collection of maps contains searchable text such as searchable street names and the like. Keywords for searching a collection of maps may be a name or other term that is associated with the imaging device (e.g., a camera name), or may be extracted from data provided by the imaging device, or may be user-supplied keywords. As an example of extracting keywords from the data provided by an imaging device, the metadata appended to an image from an imaging device may contain narrative information, such as road names or camera names, and such metadata can be used as keywords in a search of collections of digital maps.

A GIS map may comprise a variety of information, including road location information, road identification information, elevation information, land use information, and other information as appropriate or desired.

When a map is identified as relevant via a search of narrative information in the map, the map will contain at least one road part corresponding to a road part from the image, and narrative information from the relevant map is then extracted. The narrative information, for example, may be a road identification label (e.g., a name or number or combination thereof), an intersection label, or the like.

In embodiments, the relevant map is then compared with the ortho road parts image. Such comparison must account for certain differences that will exist between the relevant map and the ortho road parts image, even where they share at least one road part in common. For example, depending on map scales, the roads in the relevant map may be bigger or smaller than those in the ortho road parts image. Also for example, the relevant map may be a map of different dimensions and/or scale compared with the ortho road parts map, and may contain significantly more or less roadway information in comparison. To account for such differences, any of various matching algorithms may be used. Examples of such algorithms include template matching, stereo matching, image registration, and scale-invariant feature transform. Combinations of, variations of, and alternatives to these algorithms may also be used. Using any of these or another matching algorithm, the ortho road parts image can be matched to, for example, a section of the relevant map (or, if there is no match, an error message can be generated and a different relevant map can be sought and tried). The matching may require, in embodiments, rotation of the ortho road parts image until a match is found.

The matching process may result in a set of possible matches, where each possible match has a confidence factor that is between 0-100%. The set of possible matches may be drawn entirely from a single relevant map, or may be drawn from a plurality of relevant maps. In embodiments, the computer system can be configured to accept the possible match with the highest confidence factor. In embodiments, the computer system can seek user input in order to select the correct match from the set of possible matches. Other methods for selecting a single match from the set of possible matches are known and are suitable for the disclosed methods.

Once a match is found, the relevant map can be used to extract the identification label(s) (or other narrative information as desired) for the road(s) in the ortho road parts image. The identification label in the relevant map may be a road name or ID number, intersection name or ID number, or the like, and will be suitable for labeling the road part in the ortho road part image as well as the original image. Accordingly the identification label may be extracted and, optionally, stored in memory.

The identification label (and/or other narrative information) extracted from the relevant map is used to produce a road-labelled image. In embodiments, the road-labelled image is the original image that has been annotated with a road identification label extracted from a relevant map. In embodiments, the road-labelled image is a new map that contains the road part from the original image as well as the identification label from the relevant map. The road labelled image may be an ortho projection or may be the same projection/orientation as the original image. In embodiments, the identifications labels can be projected into the original image (or, alternatively, on further images received by the same imaging device) using an inverse of the MPRT, as mentioned herein. The identification label may be superimposed directly onto the original image (or further images received by the same imaging device) such that it overlays the original image. Alternatively, where it is desirable to reduce clutter in the road-labelled image or otherwise minimize information shown directly on the road-labelled image, it is also possible to include the identification label as metadata pertaining to the road-labelled image. The road-labelled image may be saved in memory, and/or transmitted via a network to a recipient.

In embodiments, the disclosed method further comprises advising a fixed-point camera annotator with any of the information derived herein—e.g., identification labels, relevant maps, etc. The fixed point camera annotator may be a user or may be an automated process (i.e., a processor and memory configured to carry out annotation of images). The fixed-point annotator can, in embodiments, specify which part of the original image (e.g., the camera view) corresponds to which part of a road, such as by using the road-labelled image. That is, a portion of the original image (or further images taken by the same imaging device) can be correlated to the road-labelled image.

The disclosed methods increase the utility of any webcam, traffic camera, or other imaging device. The roads captured in the images provided by such devices can be automatically or semi-automatically correlated to known and indexed roads. Such methods have a variety of uses. For example, these methods may be used to manage road use, including managing road repair resources, issuing traffic alerts and emergency information, monitoring trends in traffic, and the like.

Figure 5:
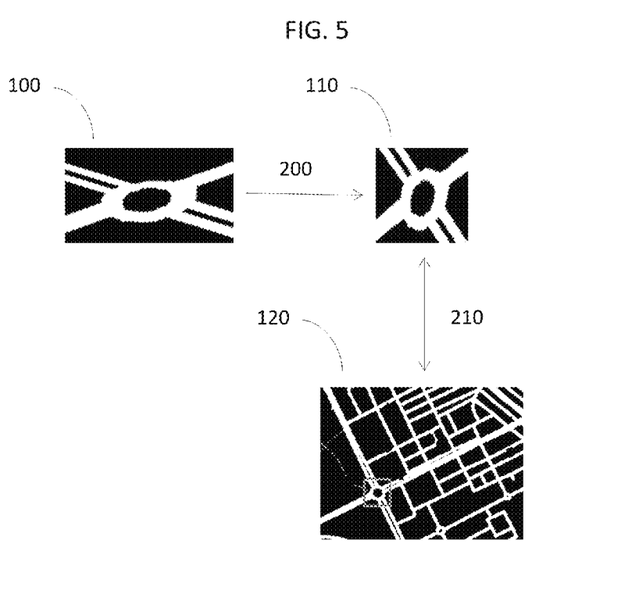
FIG. 5 provides images showing the generation of an ortho image and mapping the ortho image to a map, according to an embodiment of the disclosure.

With reference to FIG. 5, there is shown image 100, which is a black-and-white image showing only the road parts that have been extracted directly from a camera image (not shown). Image 100 is converted to ortho image 110 via method 200, which involves the MPRT. Ortho image 110 is then compared 210 against map 120 showing a larger area of roads in an area. Map 120 may be identified from a catalog of maps based on narrative information that is obtained in addition to image 100. From the comparison 210 a small section of map 120, shown in FIG. 5 as a grey box, can be identified as the most probable section of map 120 that corresponds to image 110 (although in an ortho view). With this information, narrative information (not shown) can be extracted from map 120 in order to label image 100.

In embodiments, the computer system can be configured to automatically generate an alert (and transmit such alert via a network such as via SMS or other notification/messaging systems) when certain situations are observed in the image data. For example, when an original image shows that traffic levels have surpassed a predetermined threshold level, the system can generate an alert (for sending to a specific recipient such as a news station or for broadcasting generally) that includes the traffic information as well as the identification label of the road part upon which the condition was observed. Prior to the methods disclosed herein, including a correct identification label for the road part would not have been possible.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

Example 1: Unsupervised Bayesian Density Estimation for Estimating the Number of Vehicles in an Image The example allows learning a model to predict the number of vehicles from white area of a binarized image without training data sets.

Figure 1:
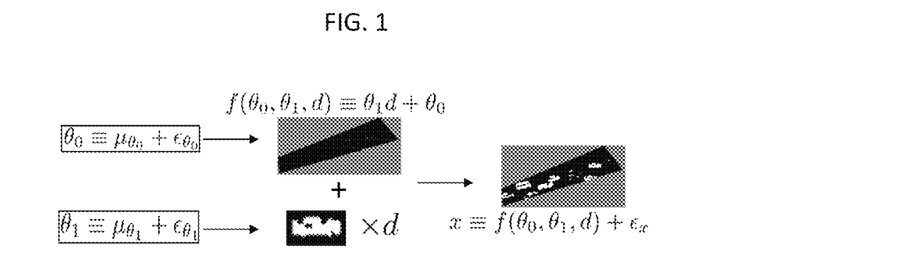
FIG. 1 provides an illustration of determining vehicles from a road part containing vehicles.
Figure 2:
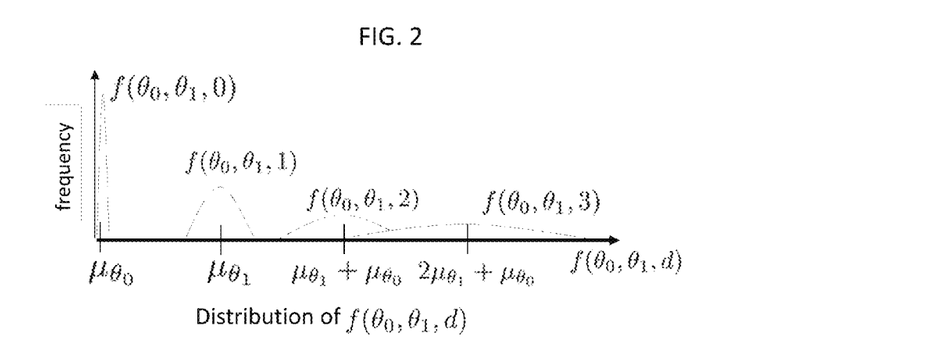
FIG. 2 provides a distribution of vehicles determined from an image using a method according to the disclosure.
Figure 3:
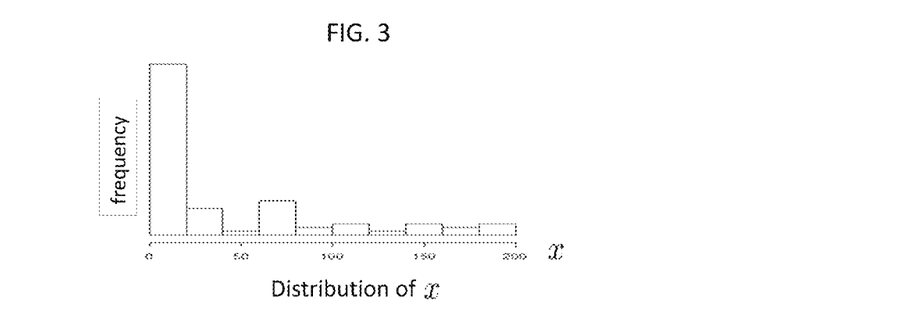
FIG. 3 provides a distribution of vehicles determined from an image using a method according to the disclosure.

The observation process is first modelled. White area $\chi$ is considered and observed as follows:

(a) First, white areas of background and one vehicle $\theta_0, \theta_1$ are generated from mean parameters $\mu\theta$ and noise $\epsilon\theta$ based on noises and variances of kinds of vehicles (see FIG. 1);

(b) white area of focused point $f(\theta_0, \theta_1, d)$ is the sum of white areas of background and d vehicles;

(c) white area distribution is as shown in graphs in FIG. 2 and FIG. 3—a mixture of some Gaussians; mean and variance values of each Gaussian are increasing linearly for the number of vehicles d;

(d) observed white area $\chi$ is observed with adding another noise $\epsilon\chi$ based on observation process; and (e) then, we estimate the model parameters by using variational Bayes—see Example 2.

Example 2: Details and Formulation of Unsupervised Bayesian Density Estimation

The general method involves modelling observation process of white area $\chi$ probabilistically, estimating the model parameters by evaluating their posterior, and predicting the number of vehicles by using estimated model. Input to the model includes data sets of white areas $\chi$. Output includes posterior $p(\eta, \theta_0, \theta_1, \beta, \rho_0, \rho_1, v, \alpha | \chi)$. The predicting phase involves input of white area $\chi$ new and posterior $p(\eta, \theta_0, \theta_1, \beta, \rho_0, \rho_1, v, \alpha | \chi)$, and an output of estimation results $\mathrm{argmax}_{\eta_{new}} p(\eta_{new} | \chi_{new})$.

An output is an estimation result, where dimensions of $\eta$ are determined using stick breaking process. We can compute learning phase efficiently by using variational Bayes.

Equations are as follows for observation model:

$$p(\chi | \eta, \theta_0, \theta_1, \beta) = \frac{\exp\left(-\frac{\beta}{2} \sum_i^{N_x} \sum_d^D [\eta_i]_d (x_i - f(\theta_0, \theta_1, d))^2\right)}{(2\pi\beta^{-1})^{\frac{N_x}{2}}}$$

Equations are as follows for priors model:

$$f(\theta_0,\theta_1,d)=\theta_1 d+\theta_0$$

$$p(\theta_0|\rho_0)=N(\theta_0|\mu_{\theta_0}^{(0)},\rho_0)$$

$$p(\theta_1|\rho_1)=N(\theta_1|\mu_{\theta_0}^{(0)},\rho_1)$$

$$p(\eta|v)=\Pi_i^{Nx}\Pi_d^D(v_d\Pi_{k=1}^{d-1}(1-v_k))^{[\eta i]d}$$

$$p(\eta|\alpha)=\Pi_d \text{Beta}(v_d|1,\alpha)$$

$$p(\beta,\rho_0,\rho_1\alpha)=\text{Gamma}(\beta|\alpha_\beta^{(0)},b_\beta^{(0)})\times \text{Gamma}(\rho_0|\alpha_{\rho 0}^{(0)},b_{\rho 0}^{(0)})\times \text{Gamma}(\rho_1|\alpha\rho 1^{(0)},b_{\rho 1}^{(0)})\times \text{Gamma}(\alpha|\alpha_\alpha^{(0)},b\alpha^{(0)})$$

Figure 4:
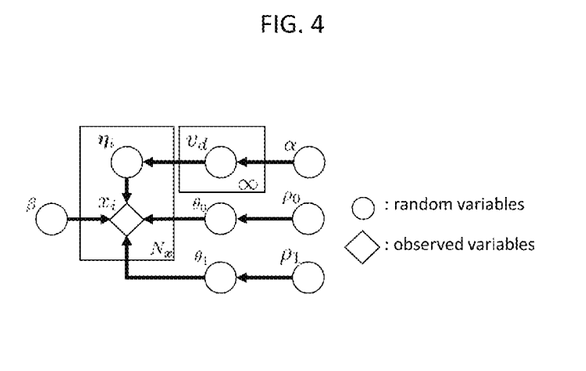
FIG. 4 provides an illustration of the modelling system used in a method according to the disclosure.

For the model given in FIG. 4:

$\chi$: observed white area ($\chi \in R$)

$\eta$: latent variables that represent number of vehicles using 1 of k representation ($\eta=\{\{[\eta 1]1,[\eta 1]2 \ldots [\eta 1]D\}, n2, \ldots, \eta N\infty\}$)

$\theta_0$: white area when number of vehicles is 0; represents unmoving objects ($\theta_0 \in R$)

$\theta_1$: white area when number of vehicles is 1 ($\theta_1 \in R$)

$\rho_0, \rho_1$: prior precision parameter of $\theta_0, \theta_1$ ($0 \leq \rho_0, \rho_1$)

$\beta$: observation noise precision ($0 \leq \beta$)

v: stick breaking process ($0 \leq v \leq 1$)

$\alpha$: parameter of stick breaking process ($0 \leq \alpha$).

Example 3

An image was obtained from a fixed-point camera. The image data was paired with narrative data, that being the names of the two roads in the image or the name of the intersection in the image. The image was of a standard intersection of two multi-lane roads, thereby forming four road parts in the image (two road parts for each road—one on either side of the intersection). Each road part contained a large number of cars, some moving and some stationary. The road parts were extracted from the image using background subtraction. Four box-shaped areas were selected based on the road parts and a clustering approach, with each box corresponding to a selected portion of a road part. The four areas were in different regions of the image and were non-overlapping. Within each area, vehicle sizes and therefore scaling ratios were determined using the methods described in Examples 1 and 2. These scaling rations were labelled a:b:c:d. Within each area, reference squares and their corresponding areas were also selected, calculated, and stored in memory. A projection reverse transformation was carried out in order to project the image (including the road parts) into an ortho view. The area of the reference squares as observed in the ortho view was calculated, and the ratios of the reference square areas in the two views (un-modified v. ortho view) were calculated. A search of the most fitted ortho views where area ratios match 1/a:1/b:1/c:1/d was carried out to identify the corresponding ortho view from a databank of ortho views.

What is claimed is:

1. A method for identifying features in an image, the method comprising:
    determining a plurality of scaling ratios from average vehicle sizes in an image from a fixed-point traffic camera, wherein the scaling ratios are identified at two or more points in the image corresponding to different positions along a single roadway;
    determining an ortho mapping function from the plurality of scaling ratios;
    producing, using the ortho mapping function, an ortho projection of a road part extracted from the image;
    identifying an identification label of a road part in a map corresponding to the road part in the ortho projection; and
    producing a road-labeled image from the image and the identification label.

2. The method of claim 1, wherein the method further comprises determining narrative information from the map.

3. The method of claim 1, wherein the method further comprises receiving, by a server via a network, the image from the fixed-point traffic camera.

4. The method of claim 1, wherein the method further comprises transmitting the road-labeled image via a network.

5. The method of claim 1, wherein the image is an image comprising roadways and vehicles, and wherein the traffic camera is remote from the server.

6. The method of claim 1, wherein the method further comprises determining narrative information from the map and transmitting the identification label and the narrative information via a network.

7. The method of claim 1, wherein the method further comprises using keywords to identify the map from a database of maps.

8. The method of claim 1, further comprising advising a fixed-point camera annotator, and correlating a portion of the image to the road-labeled image.

9. The method of claim 1, wherein the method further comprises receiving, by a server via a network, the image from the fixed-point traffic camera, and wherein the method further comprises transmitting the road-labeled image via a network.

10. The method of claim 1, wherein the method further comprises determining narrative information from the GIS map and transmitting the identification label and the narrative information via a network.

11. The method of claim 1, wherein the method further comprises advising a fixed-point camera annotator, and correlating a portion of the image to the road-labeled image.

12. A computer system for identifying features in an image, comprising:
    a processor;
    a memory coupled to the processor, the memory configured to store program instructions executable by the processor to cause the computer system to:
        determine a plurality of scaling ratios from average vehicle sizes in an image from a fixed point traffic camera, wherein the scaling ratios are identified at two or more points in the image corresponding to different positions along a single roadway;
        determine an ortho mapping function from the plurality of scaling ratios;
        produce, using the ortho mapping function, an ortho projection of a road part extracted from the image;
        identify an identification label of a road part in a map corresponding to the road part in the ortho projection; and
        produce a road-labeled image from the image and the identification label.

13. The computer system of claim 12, wherein the memory is further configured to store program instructions executable by the processor to cause the computer system to advise a fixed-point camera annotator, and correlate a portion of the image to the road-labeled image.

14. The computer system of claim 12, wherein the memory is further configured to store program instructions executable by the processor to cause the computer system to receive, by a server via a network, the image from the fixed-point traffic camera, and transmit the road-labeled image via a network.

15. The computer system of claim 12, wherein the memory is further configured to store program instructions executable by the processor to cause the computer system to determine narrative information from the map and transmit the identification label and the narrative information via a network.

16. The computer system of claim 12, wherein the memory is further configured to store program instructions executable by the processor to cause the computer system to advise a fixed-point camera annotator, and correlate a portion of the image to the road-labeled image.

17. A method for managing road use, the method comprising:

determining a plurality of scaling ratios from average vehicle sizes in an image from a fixed point traffic camera, wherein the scaling ratios are identified at two or more points in the image corresponding to different positions along a single roadway;

determining an ortho mapping function from the plurality of scaling ratios;

producing, using the ortho mapping function, an ortho projection of a road part extracted from the image;

identifying an identification label of a road part in a map corresponding to the road part in the ortho projection; and producing a road-labeled image from the image and the identification label.

18. The method of claim 17, further comprising advising a fixed-point camera annotator, who specifies which part of camera view corresponds to which part of a road, based on the road-labeled image.

19. The method of claim 17, further comprising automatically generating an alert and transmitting the alert via a network when the road-labeled image surpasses a threshold traffic volume.

* * * * *